Nov. 4, 1952    J. C. KREJCI    2,616,794
CARBON BLACK PROCESS
Filed Dec. 29, 1950

INVENTOR
JOSEPH C. KREJCI
BY
Hudson and Young
ATTORNEY

Patented Nov. 4, 1952

2,616,794

UNITED STATES PATENT OFFICE 2,616,794

CARBON BLACK PROCESS

Joseph C. Krejci, Phillips, Tex., assignor to Phillips Petroleum Company, a corporation of Delaware Application December 29, 1950, Serial No. 203,477

13 Claims. (Cl. 23—209.6)

This invention relates to a process for producing carbon black, and more particularly it relates to a method for producing carbon black by the incomplete combustion of carbonaceous gases and vapors or by decomposition thereof by contact with hot gases.

Attention is directed to U. S. Patents No. 2,375,796, issued May 15, 1945; No. 2,375,798, issued May 15, 1945; and No. 2,419,565, issued April 29, 1947, wherein related subject matter is disclosed. This application is a continuation-in-part of my copending application, Serial No. 571,655, filed January 6, 1945 (now abandoned), which application is a division of my application, Serial No. 424,084, filed December 22, 1941, and issued May 15, 1945, as U. S. Patent 2,375,795.

At the present time, most of the carbon blacks of commerce are produced by a very few processes and these blacks may be grouped into classes depending upon the types of rubber compound and vulcanized rubber which the carbon blacks will produce. A soft carbon black as compared to a hard carbon black is one which when mixed in a conventional rubber compound and then vulcanized yields a product which is softer, more resilient, more rubbery and yet tough whereas a hard carbon black in the same compound imparts stiffer, tougher characteristics, with lower resilience.

These two types of carbon black may be considered essentially as "limits" and many of the carbon blacks produced will possess hardness properties intermediate these above limits.

The commercial "channel" process produces a hard type carbon black which is especially good for compounding automotive tire tread stocks that withstand abrasion and possess good physical test properties. However, the yield of carbon by this process is only about 3.5% of the carbon content of the gas from which it is made. Some other carbon black processes give higher yields of carbon than the channel process, but in essentially all cases these blacks are of a softer type and less desirable for use in good quality tire tread stocks. These latter blacks, however, find other and varied uses, which are minor as compared to the relatively large amounts of hard channel black which go into tires at the present time and a process which would give a high yield of a hard black similar to channel black in properties, would be most desirable.

The principal object of this invention is to provide an apparatus and a process for producing carbon black of high yield and of quality comparable to or superior to the present day "channel black" for use in tire stocks.

Another object of this invention is to improve on the present day art of producing carbon black by providing an apparatus and a process which will produce carbon black out of contact with solid surfaces without depending on maintenance of streamline flow conditions as in some other processes, and with an extremely short reaction time.

Still another object of this invention is to provide a carbon black making process which is flexible in operation and especially in the respect that a product of essentially any desired properties ranging from those of the conventional soft carbon blacks, through the intermediate blacks, to the hard channel blacks, or even harder, can be produced with the same apparatus and raw materials merely by alteration and control of the operating conditions.

Still other objects and advantages will be apparent to those skilled in the art from a careful study of the following description and disclosure.

The accompanying diagrammatic drawings are a part of this specification and illustrate preferred forms of the apparatus for carrying out my invention, in which.

Like numerals on the several figures refer to the same or similar parts. These drawings have been presented in diagrammatic form only, and such conventional and well known parts as valves, flow meters, pressure regulators, temperature measuring devices, etc., for simplicity have not been shown.

Figure 1:
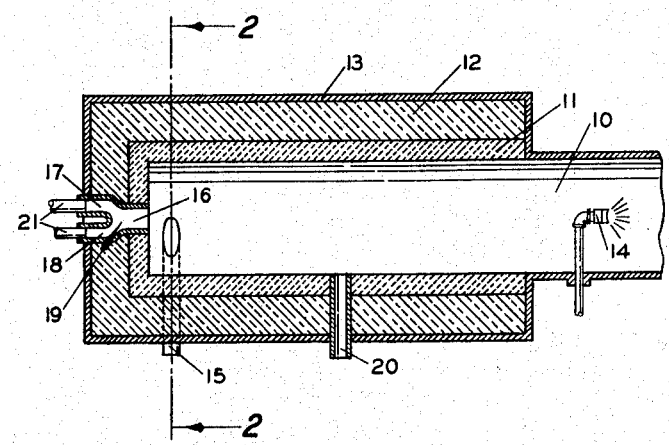
Figure 1 is a longitudinal section of a preferred form of the reaction chamber along the line 1—1 of Figure 2.
Figure 2:
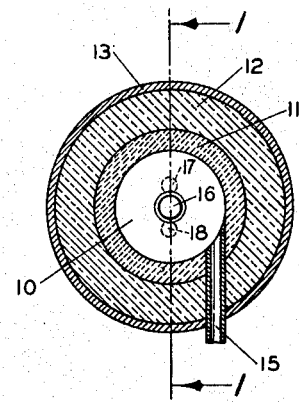
Figure 2 is a cross sectional view of the preferred form of the reaction chamber along the line 2—2 of Figure 1.

Referring to the figures, the cylindrical reaction chamber 10 has a lining 11 of highly refractory material such as sillimanite or Alundum. Between this refractory liner 11 and the cylindrical steel sheel 13 is a layer of insulation 12. The ratio of the length to the diameter of the chamber has not been found to be critical, ratios ranging from 2 to 10 have been found to give good results. The chamber is equipped with a fuel burner 15 extending through the chamber wall and terminating in an oval-shaped opening such that the incoming gaseous mixture enters the reaction chamber tangential to the inside cylindrical surface of the chamber and perpendicular to the longitudinal axis thereof. The temperature within the chamber may be measured through one or more openings, as 20. At the inlet end, the chamber is equipped with inlet tube 16 which is in line with the longitudinal axis. If one gas only is admitted to the inlet end of the chamber, this tube 16 extends through the refractory, insulation and shell, but in case a mixture of two gases is admitted, a Y 19 is used, one of the gases being introduced through arm 17 and the other through arm 18 with tube 16 in this case serving as a mixing tube as well as the chamber inlet tube. Tubes 21 from the preheat furnace carrying the reactant gas and air are connected to the Y as shown in Figures 1 and 3.

Figure 3:
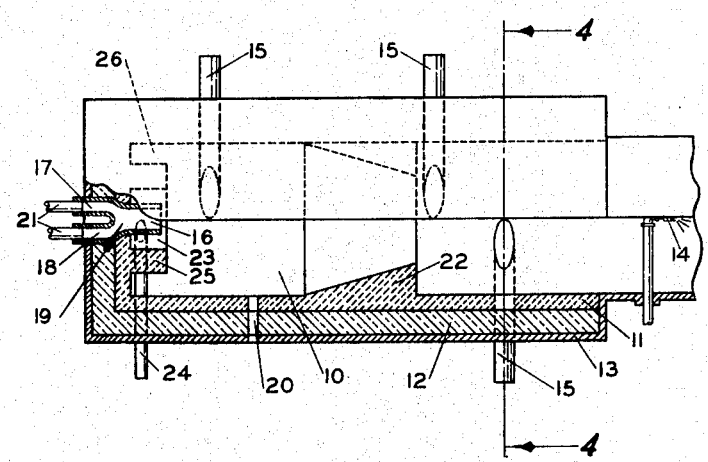
Figure 3 is a part longitudinal elevation and part longitudinal section of another embodiment of my reaction chamber, the longitudinal section being taken along the line 3—3 of Figure 4.
Figure 4:
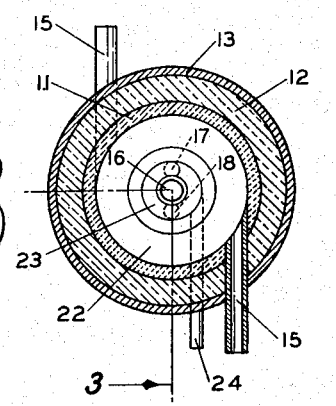
Figure 4 is a cross sectional view of this latter embodiment of my reaction chamber along the line 4—4 of Figure 3.

Figures 3 and 4 illustrate the reaction chamber in the main as in Figure 1, but with some modifications which I have found advantageous. The use of two or three additional tangential burners 15, as in Figure 3, permits a more nearly uniform distribution of heat throughout the length of the chamber, and in addition reduces by as much as 30% the total fuel required to keep the chamber walls free of carbon. When two or more tangential burners 15 are used it is not necessary that they be equal in size, since it has been found advantageous to introduce most of the fuel through a larger burner 15 at the inlet end of the chamber and to use several small burners throughout the length of the chamber as an aid in preventing carbon deposition. In this way the reactant gas comes into contact with a greater portion of the fuel throughout the length of the chamber.

In the apparatus embodiment shown in Figure 3, a modification of the chamber's cross section by insertion of conical shape 22 has been found valuable as a means of regulating the extent of mixing between the reactant gas and the tangential burner flame to any desired degree.

The introduction of air tangentially into the annular space 23 around mixing inlet tube 16 by means of tube 24, as in the chamber modification shown in Figure 3, has been found suitable as a means for the prevention of carbon deposition on the back wall 25. Due to the centrifugal force imparted by the tangential motion, the air spreads out on emerging from the annular space 23 and blankets the back wall of the chamber thus keeping the reactant gas out of contact with the wall. The mixing tube 16 and the annular duct or space 23 were extended into the chamber for convenience in installation of air tube 24. The annular space 26 surrounding the back wall 25 may be filled with a refractory material, if desired.

The reaction or chamber products exit from the open end of the reaction chamber, and are immediately cooled. Applicant has found that a spray of water absorbs sufficient heat to cool said products sufficiently below the temperature at which the carbon black particles continue to grow. A water spray 14 is shown diagrammatically in Figures 1 and 3.

In the carrying out, or operating, according to my invention, a mixture of fuel such as natural gas and air is introduced through tangential burner or burners 15 at sufficient velocity to cause the flame to adhere to the inside surface of the chamber and form a blanket of flame and products of combustion over the chamber wall throughout its length. Velocities of the incoming gaseous mixture through the tangential burner ports may vary over wide limits, but must necessarily be rather high in case the gaseous fuel and air are mixed in explosive proportions. In this case, the rate of flow of this fuel must be faster than the linear rate of flame propagation in said fuel mixture to prevent an explosion. Applicant has found that this velocity of tangential gas flow may vary from as low as 30 feet per second or less to 200 feet per second, or even more. In one test, best results were obtained by maintaining this fuel gas velocity within the range of 100 to 150 feet per second. When air alone is used as the tangential gas, carbon is easily prevented from depositing on the chamber walls even at very low tangential velocities. Thus it is seen that the tangential gas may vary between wide limits of composition, ranging from air alone on the one hand to the theoretical mixture of combustible gas and air on the other hand, or even richer than the theoretical mixture provided the mixture is not so rich as to permit carbon deposition on the chamber side walls.

The tangential fuel velocity should be rather high to maintain by centrifugal force a layer or blanket of flame and combustion products on the inside of the chamber wall. The tangential flame and combustion products travel from the tangential burner inlet toward the outlet end of the reaction chamber 10 following a helical path adjacent the inside wall of said reaction chamber thereby forming essentially a continuous layer or blanket of flame and combustion products on said inside wall. This layer or blanket of flame serves as a separating medium to prevent contact of the central contents of the chamber and the side walls.

A carbon bearing gas such as natural gas or a mixture of such gas and air with less than sufficient air for complete combustion is introduced into the reaction chamber 10 through tube 16. The carbon bearing gas and the oxygen bearing gas passed through the said inlet tube 16 will be hereinafter referred to as a reactant gas and reactant air, respectively. If reactant air is not mixed with the incoming reactant gas at this point for furnishing endothermic heat to the reactants after they enter the reaction chamber, said heat of reaction is then supplied by the tangential flame. The tube 16 directs the reactants along the longitudinal axis of the chamber and this in addition to the effect of the tangential flame which keeps the reactant gas away from the walls of the chamber assures that the reaction to carbon takes place in the central core of the chamber. In operations when oxygen containing gas is mixed with the reactant gas and tube 16 serves as the mixer, it should be sufficiently large to mix them effectively and still not so large that the period of detention of the gaseous mixture in the tube is long enough to permit decomposition so extensive as to result in an inordinately rapid deposition of any portion of the reactant gas to carbon which would in turn accumulate in the tube.

Experiments in which the oxygen bearing gas was air, revealed that periods of detention of less than 0.005 second in the mixer were satisfactory, premature carbon deposition being virtually eliminated in many cases when both reactant gas and reactant air were preheated to a temperature of the order of 2000° F., the gas being a natural gas containing 35 pounds of carbon per 1000 cubic feet. The preheating furnace may be a tube furnace or other type of furnace or other heating means of suitable design and such that the gases undergoing preheating may be heated to temperatures within the range of say 1000° to 2800° F. or even more, and such that the heated gases issuing therefrom may be at a constant, predetermined temperature, so that the operation of my invention may be properly carried out. The preheating furnace or furnaces are not shown in the drawings. Experiments have been made in which the reactant gas and reactant air were admitted to the mixer at essentially atmospheric temperature, that is, without preheating.

Carbon black yields were higher under these conditions than usually obtained in present day practice, but applicant prefers to preheat the reactant gases in order to obtain maximum yields of black.

In one experiment in which the same natural gas was used in the fuel to the tangential burner and as reactant gas, the minimum tangential fuel required to maintain the chamber wall free of carbon had 25 to 40 per cent as much natural gas as was used as reactant gas. The amount of tangential burner fuel required to prevent carbon deposition increased as the ratio of reactant air to reactant gas was decreased. In this above referred to experiment, the retention time in the chamber was approximately 0.1 second. While this particular retention time was held to about 0.1 second, it was found that the said retention time may be varied depending upon other conditions from 0.005 second to as long as 0.4 second, or even 1 second, and still obtain good quality-high yield carbon black. The temperature within the chamber may be varied within wide limits, as for example, the chamber temperature in the above referred to experiment was arbitrarily held within the range of 2000 to 3300° F., better yields of excellent quality hard black resulted from operating periods when temperatures were of the order of 2300 to 2600° F., however, high yields were obtained at chamber temperatures as high as 3100° F., and at temperatures lower than 2200° F. At all of the above-mentioned temperatures and temperature ranges carbon black yields were higher than from the conventional channel process. These operating temperatures, retention time, etc., are not intended to be definite and limiting conditions, since experiments have indicated that operating conditions may be varied within wide limits and yet obtain extraordinarily high yields of carbon black of quality equal to or superior to the high quality channel black of commerce.

The herein disclosed tangential flame serves several purposes and its proper use makes possible continuous operation of my apparatus without deposition of carbon on the chamber walls. The reaction chamber must be maintained at a relatively high temperature to cause the carbon forming reaction to take place. By the introduction of a gas and air mixture through the tangential burners a sheet of flame covers the walls and the deposition of carbon thereupon is prevented by combustion and/or water gas reactions. Still more important, the tangentially fed gases covering the walls serve as a mechanical separator or partition to prevent contact of the reactant gases with the chamber sidewalls.

By using my process, yields as high as 50 per cent of the carbon content of the reactant gas have been obtained, which is, however exceptionally high. Yields can be made to vary between relatively wide limits with a minimum of effect on the quality of carbon black produced. The black produced by my process possesses qualities equal to and in many ways superior to the "channel black" of commerce which black is the accepted measure of quality for rubber tire tread stocks. The main use for black is in the rubber industry, and only certain blacks, that is, carbon black made by certain processes, possess the proper properties to yield commercially good rubber. In the main, carbon black made by the channel process, or as it is commonly called, "channel black," is the black largely used by rubber tire manufacturers in very large quantities. To determine the quality of carbon black as regards the manufacture of rubber or tires, it is necessary to prepare a batch of compound incorporating therein the carbon black in question, vulcanize the mixture and make the conventional tests on the vulcanized product.

Table I shows operating data taken when manufacturing carbon black from natural gas containing 35 pounds of carbon per 1000 cubic feet when using my apparatus and according to my process.

*Table I*

| Run No. | Preheat Furnace— Temp., °F. | Reactants, Cu. Ft. Per Hr. | | Tangential Burner, Cu. Ft. Per Hour | | Reaction Chamber— Temp., °F. | Yield | | | |
|---|---|---|---|---|---|---|---|---|---|---|
| | | | | | | | Reactant Gas | | Total Gas | |
| | | Gas | Air | Gas | Air | | Lbs. per M. C. F. | Percent of C | Lbs. per M. C. F. | Percent of C |
| B61R [1] | 2,000 | 200 | 0 | 60 | 660 | ---------- | 11.2 | 32 | 8.6 | 24.6 |
| B57 [1] | 2,000 | 200 | 0 | 80 | 880 | 2,470 | 10.0 | 28.6 | 7.0 | 20.0 |
| B64 [1] | 2,000 | 200 | 0 | 100 | 1,100 | ---------- | 4.6 | 13.1 | 3.1 | 8.9 |
| B46R [1] | 2,000 | 200 | 200 | 60 | 660 | ---------- | 6.0 | 17.1 | 4.7 | 13.4 |
| B54 [1] | 2,000 | 200 | 200 | 80 | 880 | 2,530 | 6.1 | 17.4 | 4.4 | 12.6 |
| B56 [1] | 2,000 | 200 | 300 | 60 | 660 | 2,550 | 4.2 | 12.0 | 3.3 | 9.4 |
| B55 [1] | 2,000 | 200 | 400 | 50 | 550 | ---------- | 3.0 | 8.6 | 2.4 | 6.9 |
| B99 [1] | 2,000 | 200 | 0 | 80 | [2] 880 | 2,700 | 7.8 | 22.3 | 5.6 | 16.0 |
| B206 [3] | 2,000 | 1,200 | 0 | 600 | 6,600 | ---------- | 9.2 | 26.3 | 6.1 | 17.4 |
| B208 [3] | 2,000 | 1,200 | 0 | 700 | 7,700 | ---------- | 9.8 | 28.0 | 6.2 | 17.7 |
| B209 [3] | 2,000 | 1,600 | 0 | 700 | 7,700 | ---------- | 10.7 | 30.5 | 7.5 | 21.4 |

[1] This test was made in a furnace or chamber four and one-half inches inside diameter by twenty-two inches in length.
[2] Preheated to 2000° F.
[3] This test was made in a furnace or chamber nine and one-half inches inside diameter by forty-six inches in length.

In the above runs, B61R and B46R, the amount of fuel used in the tangential burner was not sufficient to keep the chamber wall free of carbon. Reactant gas and reactant air were heated individually in the preheat furnace and to the same temperature, as recorded in the second column of Table I. In all tests or runs excepting run B99, the gas and air to the tangential burner were not preheated, that is, the fuel mixture entered the said burner at atmospheric temperature. In run B99, however, the air portion of the tangential fuel was preheated to 2000° F. It might be mentioned, also, that while it is not necessary, the tangential burner fuel was composed of air and gas in the theoretical ratio for complete combustion to carbon dioxide and water.

It should be noted from the above data that the carbon black yields are exceptionally high, and especially so when considering the 3.5% yield of the commercial channel process when treating a natural gas of 35 pound carbon content. It might be noted, also, that the higher yields of black were obtained when the reactant gases contained no air or as termed above, no reactant air. From the above data, it seems that the less reactant air used with a given amount of reactant gas, the higher the carbon black yield. In addition, a relation also seems to exist between the amount of combined tangential air and gas and the carbon black yield.

Carbon black has been made by commercial processes with yields as high as 50% of the carbon content of the gas, but in such cases, the carbon black did not have the reinforcing properties of channel black. In fact, such black is very inferior for rubber tire making purposes to the low yield channel black and therefore found only a limited market for other purposes.

One of the outstanding advantages of my process lies in the fact that although the yield is high, a black can be produced of a quality satisfactory for tire tread purposes and in some properties superior to conventional channel black. The channel black of commerce is used herein as a standard of tire tread stock quality since black made by that process is acceptable to the tire manufacturers. To illustrate the quality of the carbon black made as herein disclosed and to compare its properties with those of channel black, batches of rubber compound were prepared according to the compounding formula, as follows:

| | Parts by weight | | Parts by weight |
|---|---|---|---|
| Smoke sheet | 100 | Stearic acid | 3 |
| Carbon black | 50 | Phenyl β naphthylamine | 1 |
| Zinc oxide | 5 | Captax | 0.9 |
| Sulfur | 3 | Pine tar | 3 |

All vulcanizations were made at 274° F. for variable lengths of time as set forth in Table II below. The test pieces for the resilience tests, as measured with a Yerzley oscillograph, were vulcanized for 70 minutes at 274° F.

*Table II*

| Sample | Vulcanization at 274° F., Minutes | Modulus, Pounds Per sq. Inch | | Break, pounds Per Square In | Elongation, Per cent | Resilience, per cent | Acetone Extractable on Original Carbon Black, per cent |
|---|---|---|---|---|---|---|---|
| | | 200% | 500% | | | | |
| B61R | 30 | 520 | 2,410 | 3,530 | 617 | 85.7 | 5.62 |
| | 60 | 620 | 2,530 | 3,240 | 580 | | |
| | 90 | 680 | 2,560 | 3,200 | 570 | | |
| B57 | 20 | 520 | 2,660 | 4,000 | 642 | 84.2 | .23 |
| | 30 | 690 | 3,140 | 3,900 | 585 | | |
| | 60 | 990 | 3,650 | 3,820 | 515 | | |
| | 90 | 1,100 | | 3,730 | 487 | | |
| B64 | 30 | 730 | 3,180 | 4,130 | 605 | 80.7 | .01 |
| | 60 | 1,000 | 3,770 | 4,100 | 530 | | |
| | 90 | 1,070 | 3,890 | 4,010 | 510 | | |
| B46R | 30 | 400 | 2,210 | 4,130 | 680 | 83.4 | 1.02 |
| | 60 | 610 | 2,800 | 3,880 | 595 | | |
| | 90 | 610 | 2,900 | 3,650 | 567 | | |
| B54 | 30 | 500 | 2,640 | 4,180 | 655 | 81.4 | .00 |
| | 60 | 710 | 3,260 | 4,100 | 592 | | |
| | 90 | 770 | 3,550 | 3,870 | 527 | | |
| B56 | 30 | 600 | 3,000 | 4,480 | 630 | 79.5 | .01 |
| | 60 | 840 | 3,770 | 4,270 | 545 | | |
| | 90 | 920 | 4,120 | 4,190 | 505 | | |
| B55 | 30 | 520 | 2,700 | 3,980 | 610 | 71.6 | .14 |
| | 60 | 805 | 3,310 | 4,300 | 600 | | |
| | 90 | 900 | 3,710 | 4,320 | 560 | | |
| B99 | 30 | 490 | 2,510 | 4,030 | 662 | 80.1 | .00 |
| | 60 | 710 | 3,120 | 3,810 | 572 | | |
| | 90 | 790 | 3,310 | 3,730 | 540 | | |
| Channel Black: Hard Black | 30 | 460 | 2,350 | 4,110 | 684 | 75.0 | |
| | 60 | 760 | 3,190 | 4,270 | 603 | | |
| | 90 | 950 | 3,530 | 4,250 | 564 | | |
| Furnace Black: Soft Black | 30 | 630 | 2,680 | 3,450 | 590 | 87.0 | |
| | 60 | 870 | 2,970 | 3,230 | 530 | | |
| | 90 | 910 | | 2,970 | 480 | | |

Table III, below, shows additional rubber tests using carbon black made according to my process and in my apparatus. These results differ from those of Table II in that the vulcanizations were made at 260° F., for the times indicated. The resilience test samples were also vulcanized at 260° F., and for a period of 70 minutes. The resilience values as given for samples containing my carbon black and vulcanized at 260° F., are essentially the same as for those vulcanized at 274° F.

*Table III*

| Sample | Vulcanization at 260° F., Minutes | Modulus, Pounds Per sq. Inch | | Break, pounds Per Square In | Elongation, Per cent | Resilience, per cent | Acetone Extractable on Original Carbon Black, per cent |
|---|---|---|---|---|---|---|---|
| | | 200% | 500% | | | | |
| B206 | 30 | 500 | 2,760 | 4,140 | 640 | 84.1 | 0.13 |
| | 60 | 790 | 3,480 | 4,085 | 565 | | |
| | 90 | 990 | 3,810 | 3,985 | 515 | | |
| B208 | 30 | 560 | 2,750 | 4,300 | 657 | 83.4 | .10 |
| | 60 | 760 | 3,490 | 4,150 | 568 | | |
| | 90 | 1,000 | 3,790 | 4,095 | 535 | | |
| B209 | 30 | 585 | 2,880 | 4,270 | 640 | 84.6 | .25 |
| | 60 | 810 | 3,500 | 4,075 | 565 | | |
| | 90 | 1,010 | 3,800 | 4,000 | 517 | | |
| B56 | 30 | 400 | 2,400 | 4,610 | 700 | | |
| | 60 | 700 | 3,415 | 4,650 | 587 | | |
| | 90 | 870 | 3,930 | 4,510 | 557 | | |
| Furnace Black: Soft Black | 20 | 340 | 1,850 | 3,120 | 670 | 87.1 | .25 |
| | 30 | 440 | 2,370 | 3,510 | 635 | | |
| | 45 | 600 | 2,640 | 3,600 | 610 | | |
| | 60 | 690 | 2,840 | 3,400 | 565 | | |
| | 90 | 870 | 3,105 | 3,400 | 535 | | |

In Tables II and III, by the word "vulcanization," heading the second column, is meant the length of time that the compound containing smoked sheet, carbon black, etc., is heated at the vulcanization temperature; in Table II, the vulcanizing temperature is 274° F. and in Table III it is 260° F., and the time is recorded in minutes. The "200% modulus" column refers to the pounds per square inch pull in a tension test when the test piece of vulcanized rubber has been stretched 200% of the length of the original test piece; the "500% modulus" refers to the pounds per square inch pull in a similar tension test when the test piece has been stretched 500% of its original length. The "Break" column represents the pounds per square inch pull at the point of rupture or break of the test piece undergoing the above-mentioned 200% and 500% modulus tests. The "Elongation" column represents the stretch or elongation at the point of "break." The "Resilience" is the complement of the hysteresis loss, or more simply expressed is a measure of the potential energy of a piece of rubber that is present as a result of applied stress and which is recoverable when the stress is removed. The "Acetone Extractable" is the per cent loss in weight of the original carbon black upon extraction with acetone.

In addition to the tests on rubbers made with my carbon black, samples containing hard and soft blacks made by the "Channel" and "Furnace" processes, respectively, are included in Table II and a "Furnace Black" (soft black) in Table III for comparison.

Upon consideration of the data of Table II, the modulus, break, elongation and resilience values of the channel black sample are characteristic of a "hard" black. Similarly, the data pertaining to the furnace black sample are characteristic of a "soft black." Based upon this classification, it is obvious that some samples in which applicant's carbon black is incorporated are similar to the hard channel black in properties, some are similar to the soft furnace black, while some possess properties intermediate these two commercial types of black. A point of importance is that some of applicant's samples are harder in respect to the physical properties of the rubber than the hard channel black sample. This point would indicate that tire tread stocks compounded with certain of applicant's carbon blacks would yield better wearing and less easily abraded tires than the conventional high quality tires in which channel black is used. It will be noted, also, that applicant's carbon black causes the compound to vulcanize more rapidly than the channel black, and for this reason, it appears that applicant's samples which were vulcanized for 60 and 90 minutes had reached a state of vulcanization more advanced than the regular control channel black samples. In one case, that of the B57 sample of carbon black of Table II, a 20 minute vulcanization was made which yielded a good rubber in all respects, even superior in most respects to the channel black sample vulcanized for thirty minutes for tire tread purposes. The "zero set" test as described in the literature and familiar to those skilled in the art was the method used to determine the extent of vulcanization. High resilience values are characteristically imparted to rubber by the soft furnace blacks. The higher resilience values among blacks of commerce ordinarily go hand-in-hand with the lower modulus values, for example, the furnace blacks of Tables II and III, and vice versa, low resilience values ordinarily accompany high modulus values, as for example, the channel black of Table II. One of the outstanding properties of applicant's blacks is their ability to impart to vulcanized rubber high modulus values and at the same time high resilience values. This property is extraordinary, as will be appreciated by those skilled in the art of rubber compounding.

Considering the data of Table III, it may be seen that the samples vulcanized at 260° F., and having my carbon black incorporated therein possess very excellent properties for tire tread stocks when compared to the channel black sample of Table II. This data also indicates that my black lends rapid vulcanizing properties to rubber compounds, and that these rubbers possess high modulus values along with high resilience.

Upon consideration of the data of Tables II and III, it is seen that certain of my carbon blacks are adaptable for making the type of rubber ordinarily requiring a soft black, the type of rubber requiring hard blacks, and the type requiring intermediate blacks. These several types of carbon blacks were made in my apparatus and according to my process by certain and systematic variations of the operating conditions. One particular advantage of my process is that it is not limited to the making of one particular kind or type of carbon black, as are present day commercial processes, but in contrast is adaptable to the making of numerous types or kinds of carbon blacks, and these various kinds of carbon black may then be made to fit changing market, supply and demand conditions. In addition, another important advantage of my process is the very high yield of carbon black obtained which high yield is a definite step forward in the conservation of a natural resource.

An example in which pure methane was used as charge stock to my reaction chamber yielded 3 to 5 pounds of carbon black per 1000 cubic feet of methane. The 3 pound yield calculated to 9.5% yield per 1000 cubic feet of reactant methane. The 5 pound yield amounts to 15.8% of the available carbon. The 3 pound yield carbon was, however, somewhat superior in rubber making qualities to the 5 pound carbon.

In contrast, the channel process operating on pure methane, as in the above experiment, gave only 0.75 pound carbon or about 2.4% yield per 1000 cubic feet of methane.

In another example, residue natural gas from a gasoline extraction plant, and a gas oil were used as charge stock. The residue natural gas was heated to approximately 2000° F. in a preheater not shown in the drawings and a gas oil of about 18° A. P. I. gravity added dropwise or in a relatively small stream to this preheated gas during its passage from the preheater to the reaction chamber 10. The gas oil was vaporized by the high temperature residue gas and this gas-vapor mixture was charged into the reaction chamber as reactant gas alone or mixed with reactant air. Residue gas, as above, and air were entered into the chamber 10 through the tangential burners 15. By control of this operation, as heretofore disclosed, a very high yield of carbon black was obtained. From the total yield of black was subtracted the yield due to the residue gas, and the remainder of the black calculated to 5 pounds black per gallon of gas oil. This combined black yielded rubber of excellent quality when made up and vulcanized as heretofore set forth.

Relating to the apparatus or more particularly to the reaction chamber 10 as shown in the drawings, it is not intended to limit the chamber to the particular design as shown. The shape does not necessarily need to be cylindrical, but may be more oval in section or even rectangular to square. The tangential burners, in the case of small chambers, may be limited to one, or in larger chambers may be two or more, the number depending on the size of the chamber. When several burners are used, they can be distributed along the length of the chamber as shown in Figures 3 and 4, or they can be at the inlet end distributed around the circumference of the chamber. In this latter case, it may be desirable to give the fuel some velocity downstream with respect to the chamber by directing the burners at a slightly less angle than 90° to the longitudinal axis of the chamber. The burner ports can be of any shape such as round, oval or rectangular. A rectangular burner has an advantage over a round one in that a greater portion of the fuel stream enters tangentially with respect to the inside surface of the chamber, this being true in the case of burners with cross sections having a large ratio of length to width and with the longer dimension of the cross section parallel to the longitudinal axis of the chamber. In one embodiment, a large number of tangential openings may be provided in the lining of the chamber and supplied with fuel from an annular space surrounding the lining. In another embodiment, a single rectangular burner extending throughout the length of the chamber can be used.

The products issuing from the chamber 10 can be cooled by any conventional means, such as mixing with a cool inert gas such as nitrogen, or with a spray of water. The position of the point of introduction of the cooling gases or water spray depends on the desired time of exposure of the carbon product to the hot gaseous products of combustion from the tangential flame. If a separate quenching chamber is provided for each reaction chamber, it should preferably have about the same diameter as the chamber and have its axis in line with the axis of the reaction chamber. This arrangement permits the tangential flame to continue into the quenching chamber to keep the products in the central core from contacting solid surfaces until they are cooled.

Other gases than air can be used with the reactant fuel as well as with the tangential fuel, for example, oxygen enriched air or even oxygen alone.

As disclosed heretofore, my process is not limited to the use of natural gas as the carbon containing gas, while in addition to either dry gas, wet gas or raw gas as it comes from the well, or gasoline extraction plant or refinery residue gas, heavier hydrocarbons such as butane, or still heavier hydrocarbon products or fractions or even normally liquid hydrocarbons may be used, as for example, the gas oil previously disclosed. Oils heavier than the gas oil of commerce may be used as a source of carbon, as well as lighter oils, such as the kerosene fraction, heavy or light naphthas, or even the gasoline range of hydrocarbons. In addition, such materials as low temperature coal gas, coal tar distillates and oil shale gases and distillates may be used as charge stock to my process.

The air or gas, or both, in the fuel to the tangential burners can be preheated as a means of introducing more heat into the chamber. Fuel rich in air, or air alone, preferably preheated, can be used in any or all of the tangential burners. Enriching the said fuel with air was found to reduce the fuel rate required to keep the chamber walls free of carbon. When air alone is used in the tangential burners, the product has a grayish color in comparison to the very black channel product, but the yield of carbon black is high. As desired, the fuel mixture to the tangential burners may be allowed to burn within the chamber or in a separate combustion chamber, the hot combustion gases then being conducted tangentially into said chamber. Since the functions of the tangential gases are to furnish heat to the chamber walls and to prevent deposition of carbon thereon, it is immaterial at what point the combustion takes place, as long as the gases reach the chamber walls in a properly heated condition.

One advantage of my process over the prior art lies in the fact that it makes possible the rapid conversion of hydrocarbons to carbon black out of contact with solid surfaces in extremely short reaction times and without depending on maintenance of streamline flow. I have verified that even under turbulent flow conditions a tangential layer of gas can be maintained to separate the wall and the gas occupying the central core of a cylindrical reaction chamber. The presence of a tangential gaseous layer may be readily demonstrated by producing a yellow flame in the central core and then introducing air through one or more tangential ports when a clear layer of air adjacent to the wall is visible. The thickness of this layer changes only little even if the amount of air introduced is two or three times the minimum required to establish the clear layer. This additional air over the minimum is apparently mixed with the reactant gas in the central core, and this fact is evidenced by the shortening of the yellow flame. If the air is introduced axially as a uniform layer next to the wall with a streamline flow in both the central flame and the air layer, a long diffusion flame results but a clear layer of air is maintained between the flame and the wall. However, as the velocities are increased into the turbulent flow range, the flame becomes shorter, the clear layer adjacent to the chamber walls disappears, and the flame is then in direct contact with the wall and carbon may be deposited thereon.

In my process, the operation at sufficiently high linear velocity of reactant gas as to give turbulent flow results in rapid transfer of heat into the moving body of reactant gas and decreases the time of reaction. This decreased time of reaction operates advantageously in my process since a much greater output of carbon black per chamber results, and a relatively large output of black per unit of chamber volume is characteristic of my reaction chamber and process of operation.

Operating under said turbulent flow conditions in the reactant gas stream has the advantage of making any given cross section of the stream normal to the direction of flow more nearly homogeneous with respect to states of decomposition, combustion, and dilution. In contrast, a diffusion flame, characteristic of other carbon black making processes, is likely to have much tar and unreacted gas in the center, a surrounding layer of substantially decomposed gas carrying good quality carbon, and an outer layer of completely decomposed gas carrying overheated carbon.

When premixed fuel is used in the tangential burners, surface combustion on the chamber walls takes place thereby heating the walls to a very high temperature. These heated walls then heat the reactant gases by radiation. An appreciable part of this surface combustion goes to $CO_2$ and $H_2O$ and does not revert to CO and $H_2$ because the carbon forming reactants do not mix completely with the combustion products and because the time at elevated temperature is too short.

The tangential flame also has the function of diluting the products, particularly in the latter part of the chamber. This dilution decreases the concentration of any undecomposed hydrocarbons and thus lessens the chance for carbon particle growth between the chamber and the point in the cooling system at which the products are cooled to a temperature below which no further reaction is possible.

Mixing of the reactant gas and the tangential flame within the chamber itself has been found to play an important role in my process. In addition to aiding in heat transfer, such mixing improves the quality of the product, as for example, the amount of acetone extractable matter in the carbon black is readily controlled by regulating the extent of this mixing, the greater the extent of mixing the less the acetone extractable.

Another advantage of this process over the prior art is its greater flexibility as to controlling the operation and as to control the quality of product. The properties of the product can be varied over a wide range by adjusting the fuel rate to the tangential burner, the ratio of reactant air to reactant gas, gas and air preheat temperature, reaction chamber temperature, and cooling of the chamber product, etc. Using my apparatus and the same raw materials, carbon black varying in properties from those of a soft "thermal decomposition" black to those of a hard channel black was produced.

While chambers varying in diameter from four and one-half inches to nine and one-half inches have been successfully used, as disclosed heretofore, I do not wish to limit my apparatus to these sizes since other sizes both smaller and larger may be used. For chambers of large diameters and corresponding length, such as would be used in commerce, the optimum number and arrangement of tangential burners would need to be determined Materials of construction, as for example, preheat furnace tubes, reaction chamber insulation and lining, etc., may be selected from among those items commercially available and best suited to the operating conditions as herein disclosed without departing from the scope of my invention.

While the preferred apparatus and method of operation for carrying out my invention are described in this specification, it will be obvious to those skilled in the art that there may be many possible variations of the apparatus and methods of operation as may be learned from operating experience and yet remain within the intended spirit and scope of my invention, and limited only by the following claims.

I claim:

1. The process of producing carbon black comprising introducing reactant hydrocarbon in the gaseous condition through an inlet tube at approximately the center of the inlet end wall of a reaction chamber having an inlet end wall carrying said inlet tube, an outlet end, and a generally cylindrical side wall, said chamber having a gradual diametric constriction between the inlet end wall and the outlet end, and said inlet tube being so positioned in said inlet end wall as to form an annular space therebetween, the reactant hydrocarbon being introduced in a direction substantially parallel to the longitudinal axis of the reaction chamber; introducing air into said annular space through a tube, this tube being so positioned as to direct the flow of air therethrough in a direction tangent to the outer wall of said annular space, and essentially in a plane perpendicular to the longitudinal axis of said generally cylindrical chamber, said air preventing carbon deposition on said inlet tube; introducing oxygen-containing gas into the reaction chamber near the inlet end wall through a burner port and introducing further oxygen-containing gas into the reaction chamber through another burner port near the diametric constriction but on the downstream side thereof, said burner ports being so positioned as to direct the flow of oxygen-containing gases therethrough in a direction tangent to the inner surface of the side wall and with the predominating component of a motion in a plane perpendicular to the longitudinal axis of said generally cylindrical chamber, said oxygen-containing gas and a portion of the reactant hydrocarbon mixing to form a combustible mixture, and said further oxygen-containing gas and another portion of the reactant hydrocarbon mixing to form a combustible mixture, burning these combustible mixtures to maintain the temperature of the reaction chamber at the carbon black forming temperature, the oxygen-containing gases being introduced through said burner ports at a sufficiently high velocity and in sufficient quantities to maintain the flame and combustion products by centrifugal force adjacent the whole inner surface of the chamber side walls, thus forming a separating layer of said flame and combustion products between the side walls and the reactant gas mixture in the reaction chamber; cooling the effluents of the reaction chamber to below the carbon black forming temperature and separating the carbon black from the products of combustion.

2. The process of producing carbon black comprising continously introducing a stream of gaseous hydrocarbon through the inlet end wall of a reaction chamber having an inlet end wall, an outlet end, and a side wall having a generally circular transverse cross section, said chamber having a diametric constriction intermediate the ends of the chamber and of progressively decreasing diameter in the direction of the outlet end, the cross sectional area of the outlet end being substantially the same as the cross sectional area of the reaction chamber adjacent said constriction, the reactant hydrocarbon being introduced in a direction parallel to the longitudinal axis of the chamber; introducing oxygen-containing gas near the inlet end wall through a burner port, introducing further oxygen-containing gas into the reaction chamber through another burner port near the diametric constriction but on the downstream side thereof, said burner ports being so positioned as to direct the flow of oxygen-containing gases therethrough in a direction tangent to the inner surface of the side wall and with the predominating component of motion in a plane perpendicular to the longitudinal axis of said generally cylindrical chamber, said oxygen-containing gases and a portion of the reactant hydrocarbon mixing to form combustible mixtures, burning the combustion mixtures to maintain the temperature of the reaction chamber at the carbon black forming temperature, the oxygen-containing gases being introduced through said burner ports at sufficiently high velocities and in sufficient quantities to maintain the flames and combustion products by centrifugal force adjacent the inner surface of the chamber side wall, thus forming a separating layer of said flame and combustion products between the side wall and the reactant hydrocarbon in the reaction chamber, cooling the effluents of the reaction chamber to below the carbon black forming temperature and separating the carbon black from the products of combustion.

3. The process of producing carbon black comprising continuously introducing a stream of reactant hydrocarbon through an inlet tube at approximately the center of the inlet end wall of a reaction chamber having an inlet end wall, an outlet end, and a generally cylindrical side wall, the cross sectional area of the outlet end being substantially the same as the cross sectional area of the cylindrical reaction chamber at this point, said chamber having a diametric constriction of gradually decreasing diameter between the inlet end wall and the outlet end, the smaller diameter end of the constriction being in the direction of the outlet end; said inlet tube being so positioned in the inlet end wall as to form an annular space therebetween; the reactant hydrocarbon being introduced in a direction substantially parallel to the longitudinal axis of the reaction chamber; introducing oxygen-containing gas into said annular space through a burner tube, this burner tube being so positioned as to direct the flow of oxygen-containing gas therethrough in a direction tangent to the outer wall of said annular space and essentially in a plane perpendicular to the longitudinal axis of the reaction chamber, said oxygen-containing gas supporting combustion of at least a portion of the reactant hydrocarbon issuing from said inlet tube thereby preventing deposition of carbon thereon; introducing a mixture of gaseous fuel and at least sufficient oxygen-containing gas for substantially complete combustion of said gaseous fuel into the reaction chamber near the inlet end wall through a burner port and introducing a further mixture of gaseous fuel and at least sufficient oxygen-containing gas for substantially complete combustion of said gaseous fuel into the reaction chamber through another burner port near the diametric constriction but on the downstream side thereof, said burner ports being so positioned as to direct the flow of gaseous fuel-oxygen containing gas mixtures therethrough in a direction tangent to the inner surface of the sidewall and with the predominating component of motion in a plane perpendicular to the longitudinal axis of said chamber, burning these combustible mixtures to maintain the temperature of the reaction chamber at the carbon black forming temperature, and said combustible mixtures being introduced through said burner ports at sufficiently high velocities and in sufficient quantities to maintain the flames and combustion products by centrifugal force adjacent the inner surface of the chamber side wall, thus forming a separating layer of said flames and combustion products between the side walls and the reactant gas mixture in the reaction chamber; cooling the effluents of the reaction chamber to below the carbon black forming temperature and separating the carbon black from the products of combustion.

4. The process of claim 3 wherein said reactant hydrocarbon introduced through said inlet tube comprises a gas oil.

5. An apparatus for the production of carbon black comprising a generally cylindrical reaction chamber having the side wall thereof insulated, an insulated inlet end wall and an outlet end, said chamber containing an annular refractory member at a point between the inlet end and outlet end, said member having a conical bore having an inlet end the same size as said chamber and an outlet end having a substantially smaller inside diameter than that of the cylindrical reaction chamber; the inlet end of the chamber carrying an inlet tube disposed at the approximate center thereof and axially of the chamber, and the insulated side wall carrying a burner tube at the inlet end of the chamber and another burner tube at a point on the downstream side of said annular refractory member, the longitudinal axes of said burner tubes being essentially tangent to the inner surface of said side wall and approximately in a plane perpendicular to the longitudinal axis of the cylindrical chamber.

6. An apparatus as in claim 5 wherein the inlet tube is disposed in the inlet end wall.

7. An apparatus as in claim 5 wherein the annular refractory member is at approximately a mid point of the inside length of the reaction chamber.

8. An apparatus as in claim 7 wherein the burner tube on the downstream side of the annular refractory member is substantially adjacent said annular member.

9. An apparatus for the production of carbon black comprising a generally cylindrical reaction chamber having the side wall thereof insulated, an insulated inlet end wall and an outlet end, said chamber containing an annular refractory member at a point between the inlet end and outlet end, said member having a conical bore having an inlet end the same size as said chamber and an outlet end having a substantially smaller inside diameter than that of the cylindrical reaction chamber, said inlet end wall carrying an inlet tube disposed axially and at the approximate center thereof and extending in a downstream direction from said wall, an annular ring of refractory adjacent the inlet end wall and extending in a downstream direction and concentric with the axes of the inlet tube and chamber and forming an annular space between said inlet tube and said refractory ring, a second inlet tube extending through the chamber side wall and through the refractory ring and so disposed in the latter that the longitudinal axis of said tube is tangent to the inner wall of said refractory ring and approximately perpendicular to the longitudinal axis of the reaction chamber; the insulated side wall carrying a burner tube at the inlet end of the chamber and another burner tube at a point on the downstream side of said annular refractory member, the longitudinal axes of said burner tubes being essentially tangent to the inner surface of said side wall and approximately in a plane perpendicular to the longitudinal axis of the cylindrical chamber.

10. An apparatus as in claim 9 wherein the annular refractory member is at approximately a mid point of the inside length of the reaction chamber.

11. An apparatus as in claim 9 wherein the burner tube on the downstream side of the annular refractory member is substantially adjacent said annular member.

12. The process of producing carbon black comprising continuously introducing reactant hydrocarbon in the gaseous state into the inlet portion of a reaction chamber having an inlet portion, a generally circular transverse cross section, an outlet end, and an interior passage unobstructed from and including said inlet portion to and including said outlet end except for an intermediate conical restrictor, continuously flowing the reactant hydrocarbon the major portion of the length of said chamber inside said chamber from said inlet portion to said outlet end in a direction substantially parallel to the longitudinal axis of the reaction chamber; introducing oxygen-containing gas into the reaction chamber near the inlet portion through a burner port, said burner port being so positioned as to direct the flow of said oxygen-containing gas in a direction tangent to the inner surface of the side wall and with the predominating component of motion in a plane perpedicular to the longitudinal axis of said cylindrical chamber, burning the resulting mixture of reactant hydrocarbon and oxygen-containing gas to maintain the temperature of the reaction chamber at a carbon black forming temperature, gradually constricting said resulting mixture to a smaller diameter, introducing more oxygen-containing gas into the reaction chamber near and after the point of constriction through a burner port in a direction predominately tangent to the wall of said reaction chamber, the oxygen-containing gas being introduced through said burner ports at a sufficiently high velocity and in sufficient quantity as to maintain by centrifugal force the flame and combustion products produced by the oxygen-containing gas adjacent substantially the whole inner surface of the chamber from said inlet portion to said outlet end thus forming a separating layer of said flame and combustion products between the side wall and the reactant mixture in the reaction chamber, cooling the effluents of the reaction chamber to below the carbon black forming temperature and separating the carbon black from the products of combustion.

13. The process of claim 12 wherein said reactant hydrocarbon introduced into the inlet portion of said reaction chamber comprises a gas oil.

JOSEPH C. KREJCI.

REFERENCES CITED

The following references are of record in the file of this patent:

UNITED STATES PATENTS

| Number | Name | Date |
|---|---|---|
| 2,368,827 | Hanson | Feb. 6, 1945 |
| 2,368,828 | Hanson | Feb. 6, 1945 |
| 2,375,795 | Krejci | May 15, 1945 |